United States Patent [19]

Persson et al.

[11] Patent Number: 4,844,968

[45] Date of Patent: Jul. 4, 1989

[54] HEAT FORM PRESSED PRODUCT AND A METHOD OF HEAT FORM PRESSING

[75] Inventors: Göran Persson, Jönköping; Ove Gustavsson, Forserum; Bernt-Ola Hugosson, Skillingaryd, all of Sweden

[73] Assignee: Swedoor Aktiebolag, Sweden

[21] Appl. No.: 38,232

[22] Filed: Apr. 14, 1987

[30] Foreign Application Priority Data

Apr. 24, 1986 [SE] Sweden .................. 8601898-3

[51] Int. Cl.⁴ .................. B32B 3/00; D04H 1/16
[52] U.S. Cl. .................. 428/181; 264/112;
264/113; 264/119; 428/174; 428/215; 428/219;
428/220; 428/249; 428/326; 428/342; 428/372;
428/534; 428/535; 428/537.1; 428/537.5;
428/904.4
[58] Field of Search ............ 428/213, 215, 219, 220,
428/249, 326, 342, 372, 401, 535, 529, 531,
537.1, 537.5, 904.4, 174, 181, 534; 264/112, 113,
119

[56] References Cited

U.S. PATENT DOCUMENTS

| 3,563,844 | 2/1971 | Brown | 428/535 |
| 3,846,219 | 11/1974 | Kunz | 428/529 |
| 4,221,751 | 9/1980 | Haataja et al. | 264/119 |
| 4,277,428 | 7/1981 | Luck et al. | 264/119 |
| 4,307,883 | 12/1981 | Kelly | 428/535 |
| 4,610,900 | 9/1986 | Nishibori | 264/119 |
| 4,622,190 | 11/1986 | Schultz | 264/119 |
| 4,629,594 | 12/1986 | Munk | 264/119 |
| 4,675,138 | 6/1987 | Bach et al. | 264/119 |

FOREIGN PATENT DOCUMENTS 2529676  3/1975  Fed. Rep. of Germany ...... 428/535

Primary Examiner—George F. Lesmes
Assistant Examiner—J. B. Monroe
Attorney, Agent, or Firm—Lerner, David, Littenberg, Krumholz & Mentlik

[57] ABSTRACT

A thin, plate-shaped object, especially a door skin, and a method of manufacturing such object, comprising a resin impregnated outer layer arranged directly onto a layer of a binder impregnated wood fine chips layer acting as a forming support for the fibre sheet material.

A layer of coarse wood chips acts as a reinforcing and handling characteristics defining layer for the relatively large (some m²) and relatively thin (2 to 5 millimeteres) door skin.

6 Claims, 1 Drawing Sheet

HEAT FORM PRESSED PRODUCT AND A METHOD OF HEAT FORM PRESSING

The present invention relates to heat form pressed products and a method of heat form pressing. Specifically, the invention is directed to plate-shaped, thin products useful as so called door skins, i.e. outer layers for internal doors.

The problem of the invention is to provide and make possible a rational production of price worth, thin, plate-shaped products, one side of each having well defined dimension and surface characteristics.

Previously, there has been a production of plates comprising a so called over-lay, i.e. a binder impregnated paper. Such manufacturing has been based on board techniques. The fibres of plates manufactured according to said technique are difficult to manage, especially at high standards of accurate dimension and surface structure reproduction.

In order to eliminate this, the present invention suggests a heat form pressed, thin plate, one side of which has a well defined, predetermined shape and surface characteristics. The plate is especially well suited as a door skin.

The plate is characterized in that said side comprises a formable, resin impregnated fibre sheet material forming an outer surface, that directly under said layer is arranged a layer of binder impregnated wood fine chips acting as a forming support for the fibre sheet material, and that below said wood fine chips layer there is arranged a layer of binder impregnated wood coarse chips acting as a mechanically reinforcing layer.

Preferably, the fibre sheet material is a crepe paper impregnated by a curing resin.

In one embodiment the paper is a phenol resin impregnated paper having a surface weight in the interval 30 g/m² to 150 g/m².

A plate comprising said wood chips layer and fibre sheet layer usually has a thickness in the interval 2 to 5 millimeters.

It has been found that the plate according to the present invention has especially favourable characteristics when the chips are selected such that the coarse chips pass through a screen having one millimetre diameter openings and the coarse chips pass through a screen having four millimetre diameter openings.

The thickness relation between the layers preferably is such that the thickness of the coarse chips layer is at least twice the thickness of the fine chips layer.

The invention also relates to a method of manufacturing a plate of the type mentioned.

The method is characterized in that a layer of binder impregnated wood fine chips is laid out on a formable, resin impregnated fibre sheet material, that directly on said layer a layer of a binder impregnated coarse wood chips material is placed, and that such structure, where the fibre sheet material forms a support, is introduced into a heat press device.

Preferably, the coarse chips layer is laid out with a thickness approximately twice the thickness of the fine chips layer, and such that the total thickness of the two laid out, not compressed layers falls within the interval 15 to 30 millimeters.

The resin impregnated fibre material preferably is selected as a resin impregnated crepe paper having a surface weight in the interval 30 g/m² to 150 g/m².

One embodiment of the invention is shown on the drawing, where

FIG. 1 in a perspective view shows a door skin according to the invention,

The plate-shaped product 10 is a so called door skin, i.e. a plate having a predetermined size and shape and intended for forming an entirely finished outer layer of a door blade. The dimension of the plate coincides with the size of the door frame and the thickness falls within the interval 2 to 5 millimeters. The weight is of the order 5 to 10 kgs.

The outer side or "front side" 11 of the plate is the side directly taken from the production, which without any further working represents an accurate reproduction of the mould surface of the heat form press and basically is ready for use, or suitable for further surface treatment, for instance painting. An example of a surface structure is the wood fibre pattern of solid wood.

Figure 1:
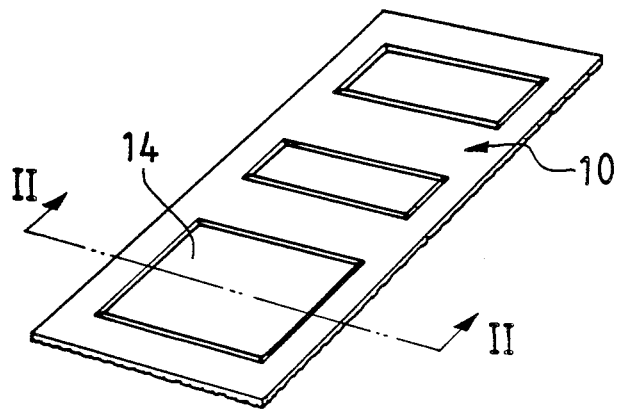
Figure 2:
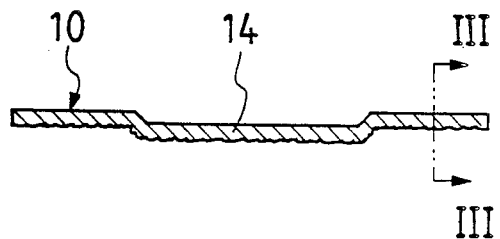
FIG. 2 is a section along line II—II in FIG. 1.
Figure 3:
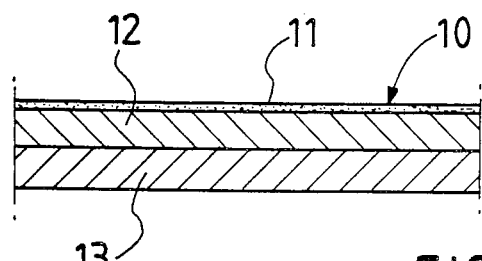
FIG. 3 is a cross section along line III—III in FIG. 2.

According to the present invention it has been found that a combination of layers according to FIG. 3 is particularly well suited for the specific object. From the very beginning the layer 11 is a resin impregnated crepe paper having a surface weight in the interval 30 g/m² to 150 g/m². A phenol resin preferably is used as resin.

This surface layer 11, together with the layers 12 and 13, is formed in a heat press. The layer 12 comprise so called fine chips, i.e. wood chips of a size passing through a screen having one millimetre diameter openings. Said chips are impregnated by a binder, usually an urea glue.

Because the thin, formable surfaces layer 11 rests against the layer 12 comprising fine wooden chips, there will be achieved a very accurate reproduction of the surface structure of the heat press form or mould in the layer 11 because the plasticity of the layer 12 originating from the fine chips composition thereof.

Probably, the layer 13 also acts a mechanically reinforcing layer when forming, although the actual object of the layer 13 is to give the finished product stability and handling characteristics. The layer 13 comprise so called coarse chips, in the present context chips passing through a screen having four millimeter diameter openings.

The thickness relation between the material of the layer 12 and the material of the layer 13 approximately is 1:2 in an unpressed state. When starting the pressing operation the fine chips and the coarse chips are laid out on the crepe paper 11 as uniform layers having said thickness relation.

The forming operation comprises heat as well as pressure. Preferably, the pressure is approximately 30 kp/cm² and the temperature and press time are determined by the curing time of the binder. When using binders of the type mentioned, the temperature is around 150° C. and the press time is approximately 4 minutes.

The layers 12 and 13 are laid out to a combined thickness of approximately 15 to 30 millimetres and the structure is compressed to a thickness of 2 to 5 millimeters.

Due to the resin contents of the layer 11 and the possibility thereof to smoothly and accurately conform to the shape of the mould, for transferring such an accurate conformity to the fine chips layer 12 and thereby permanently, accurately and conformly transferring the mould surface structure to the outside of the layer 11, an excellent reproduction is obtained. According to the present invention; this reproduction—it has turned out, which is important to the invention—does also exist when deep forming, i.e. when forming recessed portions or panels 14 in a door skin, where said recess portions may be located at a substantial depth, for instance ten millimetres or more, below a reference plane. The possibility of deep forming thin layer structures is a major step forward of the wood chips forming technique and represents a considerable advantage. However, the invention does not merely allow deep forming but also a conform transfer of a surface structure at such forming.

The surface structure might comprise an entirely smooth surface, but frequently, in connection with doors, a wooden fibre pattern of solid wood is desirable, and this is perfectly possible to achieve by the technique that has been described.

The manufacturing process means that the layer 11 is used as a substrate and support for fine and coarse chips.

The chips layers are laid out on the substrate in layers having the thickness relation mentioned and the entire structure is transported, for instance on a conveyor, into the heat press. In one single forming step, at the temperature and pressure levels indicated, there is formed a thin plate product having portions recessed to a substantial depth, if required, and a mould conform surface characteristics. Such surface may be used directly as it is, for instance for door skins.

Thus, there is suggested an efficient production comprising merely one single forming step.

We claim:

1. A panel adapted for use as a door skin, said panel comprising, a three layer composite structure including a first layer of resin impregnated fiber sheet forming an outer surface on the front side of said panel, a second layer of binder impregnated fine wood chips forming an intermediate layer and a third layer of binder impregnated coarse wood chips forming a lower surface on the back side of said panel, said three layer composite structure having a uniform thickness of about 2 to 5 millimeters and at least one recessed portion formed therein, wherein the outer surface on the at least one recessed portion is situated between about 1 and 10 millimeters below the outer surface of the remaining portion of said panel.

2. A panel as claimed in claim 1, wherein said resin impregnated fiber sheet comprises crepe paper having a surface weight of about 30 g/m$^2$ to 150 g/m$^2$.

3. A method of manufacturing a panel, the front of which has defined shape and surface characteristics, said panel being adapted as a door skin, said method comprising the steps of:
   a. laying out a first layer of a formable, resin impregnated fiber sheet to form the front side of said panel;
   b. laying out a second layer of binder impregnated fine chips onto said first layer, said second layer having a thickness in the range of about 5.0 to 10.0 millimeters;
   c. laying out a third layer of binder impregnated coarse chips onto said second layer, said third layer having a thickness in the range of about 10.0 to 20.0 millimeters, said third layer having a thickness approximately twice the thickness of said second layer;
   d. introducing the resulting three layer structure, with said fibre sheet forming a support therefor, into a heat pressing device;
   e. applying heat and pressure to said three layer structure to simultaneously form a panel having a front side and a recessed portion in said panel, said panel and said recessed portion both having a uniform thickness of about 2 to 5 millimeters, said recessed portion being recessed between 1 and 10 millimeters from said from side of said panel.

4. The method as defined in claim 3, wherein predetermined surface characteristics are molded into said front side of said panel.

5. The method as defined in claim 3, wherein said resin impregnated fiber sheet is a resin impregnated crepe paper having a surface weight in the range of about 30 g/m$^2$ to 150 g/m$^2$.

6. The method as defined in claim 5, wherein the pressure applied to said three layer structure is approximately 30 kp/cm$^2$ for approximately four minutes and the heat applied to said three layer structure is approximately 150° C.

* * * * *